United States Patent
Guan

(10) Patent No.: US 10,510,247 B2
(45) Date of Patent: Dec. 17, 2019

(54) METHOD AND DEVICE FOR DETECTING WHETHER OBJECT VIOLATES TRAFFIC SIGNAL

(71) Applicant: BOE TECHNOLOGY GROUP CO., LTD., Beijing (CN)

(72) Inventor: Hongtao Guan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/053,921

(22) Filed: Aug. 3, 2018

(65) Prior Publication Data

US 2019/0206239 A1    Jul. 4, 2019

(30) Foreign Application Priority Data

Jan. 3, 2018   (CN) .......................... 2018 1 0004242

(51) Int. Cl.
| | |
|---|---|
| *G08G 1/017* | (2006.01) |
| *G08G 1/015* | (2006.01) |
| *G08G 1/01* | (2006.01) |
| *G06K 9/00* | (2006.01) |

(52) U.S. Cl.
CPC ....... *G08G 1/0175* (2013.01); *G06K 9/00825* (2013.01); *G08G 1/015* (2013.01); *G08G 1/0116* (2013.01)

(58) Field of Classification Search
CPC .... G08G 1/0175; G08G 1/0116; G08G 1/015; G06K 9/00825
USPC ........ 340/937, 933, 901, 902, 903, 904, 905
See application file for complete search history.

(56) References Cited

U.S. PATENT DOCUMENTS

2004/0101166 A1*  5/2004  Williams ................. G01P 3/38
382/104

FOREIGN PATENT DOCUMENTS

| CN | 101369378 A | 2/2009 |
|---|---|---|
| CN | 201525462 U | 7/2010 |
| CN | 102103798 A | 6/2011 |
| CN | 102982681 A | 3/2013 |
| CN | 103426328 A | 12/2013 |
| CN | 104554214 A | 4/2015 |
| CN | 105539706 A | 5/2016 |
| CN | 105644364 A | 6/2016 |
| CN | 105654755 A | 6/2016 |
| CN | 105809964 A | 7/2016 |
| CN | 105869418 A | 8/2016 |

(Continued)

OTHER PUBLICATIONS

First Office Action for Chinese Patent Application No. 201810004242.6 dated Jul. 3, 2019.

*Primary Examiner* — Daryl C Pope
(74) *Attorney, Agent, or Firm* — Calfee, Halter & Griswold LLP

(57) ABSTRACT

The present disclosure provides a method and a device for detecting whether an object violates a traffic signal. The terminal moving along with the object is in communication with the network to acquire the state of the traffic signal in the moving direction of the object; when the acquired state of the traffic signal is in the no-passing state, the terminal determines a current position of the object according to beacons surrounding the intersection where the object is; and then, the terminal moving along with the object detects whether the object violates the traffic signal according to the determined current position of the object.

16 Claims, 4 Drawing Sheets

(56) References Cited

FOREIGN PATENT DOCUMENTS

| | | |
|---|---|---|
| CN | 205451490 U | 8/2016 |
| CN | 106600978 A | 4/2017 |
| CN | 106882190 A | 6/2017 |
| CN | 106923417 A | 7/2017 |
| JP | 2017049885 A | 3/2017 |

* cited by examiner

METHOD AND DEVICE FOR DETECTING WHETHER OBJECT VIOLATES TRAFFIC SIGNAL

CROSS REFERENCE TO RELATED APPLICATIONS

This application claims the benefit of China Patent Application No. 201810004242.6 filed with the China Patent Office on Jan. 3, 2018, the entire content of which is hereby incorporated by reference.

TECHNICAL FIELD

The present disclosure relates to a field of wireless communication technology, in particular, to a method and a device for detecting whether an object violates a traffic signal.

BACKGROUND

At present, there are various kinds of objects in life. Some objects do not have number plate or their number plates are not set to be easy for visibility, thus, when such an object violates a traffic signal, the camera provided at the intersection cannot capture the number plate of the object, thereby such objects cannot be detected whether they violate the traffic signal. This not only disrupts the traffic order, but also causes traffic accidents and endangers personal safety.

For example, the shared bicycle is a new type of transportation in recent years. Due to the convenience and cheapness of the shared bicycle, it has been accepted by the general public. However, in daily life, some citizens often do not obey the traffic rules and run the red light when riding the bicycle. However, the number plate of the shared bicycle is relatively hidden, and the current camera provided at the intersection can only recognize and photograph a car's number plate, and cannot capture and identify the bicycle license for the shared bicycle, thus recognition of which shared bicycle violates the red light can only be investigated manually.

In a word, there is no technical solution to detect whether an object violates the traffic signal in the prior art, thereby resulting in many traffic accidents.

SUMMARY

The present disclosure provides a method and a device for detecting whether an object violates a traffic signal.

An embodiment of the present disclosure provides method for detecting whether an object violates a traffic signal, which includes the following steps.

A terminal moving along with the object acquires a current signal state of the traffic signal in the moving direction of the object through a network.

The terminal determines a current position of the object according to beacons surrounding the intersection where the object is, if the current signal state of the traffic signal is no passing.

The terminal detects whether the object violates a traffic signal according to the current position of the object.

An embodiment of the present disclosure provides a device for detecting whether an object violates a traffic signal, which includes at least one processing unit and at least one storage unit. The at least one storage unit stores program code, which causes the at least one processing unit to perform the following steps when executed:

acquiring a current signal state of the traffic signal in the moving direction of the object through a network;

determining a current position of the object according to beacons surrounding the intersection where the object is, if the current signal state of the traffic signal is no passing; and detecting whether the object violates a traffic signal according to the current position of the object.

An embodiment of the present disclosure provides another device for detecting whether an object violates a traffic signal, which includes an acquiring module, a determining module and a detecting module.

The acquiring module is configured to acquire a current signal state of the traffic signal in the moving direction of the object through a network.

The determining module is configured to determine a current position of the object according to beacons surrounding the intersection where the object is, if the current signal state of the traffic signal is no passing.

The detecting module is configured to detect whether the object violates a traffic signal according to the current position of the object.

In the embodiment of the present invention, the terminal moving along with the object is in communication with the network to acquire the state of the traffic signal in the moving direction of the object; when the acquired state of the traffic signal is in the no-passing state, the terminal determines a current position of the object according to beacons surrounding the intersection where the object is; and then, the terminal moving along with the object detects whether the object violates the traffic signal according to the determined current position of the object. Since the terminal moving along with the object according to the embodiment of the present invention can determine the state of the traffic signal through the network, determine the specific position of the object according to the beacons surrounding the intersection, and detect whether the object violates the traffic signal according to the state of the traffic signal and the specific position of the object, t the occurrence of traffic accidents is reduced.

BRIEF DESCRIPTION OF THE DRAWINGS

In order to more clearly illustrate the technical solutions in the embodiments of the present invention, the drawings used in the description of the embodiments are briefly described below. Obviously, the drawings in the following description are merely some embodiments of the present invention, and those skilled in the art can also obtain other drawings based on these drawings without any creative labor.

DETAILED DESCRIPTION

To make the objectives, technical solutions, and advantages of the present disclosure clearer, the present disclosure will be described in detail below with reference to the accompanying drawings. Obviously, the described embodiments are merely some but not all of the embodiments of the present disclosure. All other embodiments which are obtained by those skilled in the art based on the embodiments of the present disclosure without creative labor shall fall within the protection scope of the present disclosure.

Figure 1:
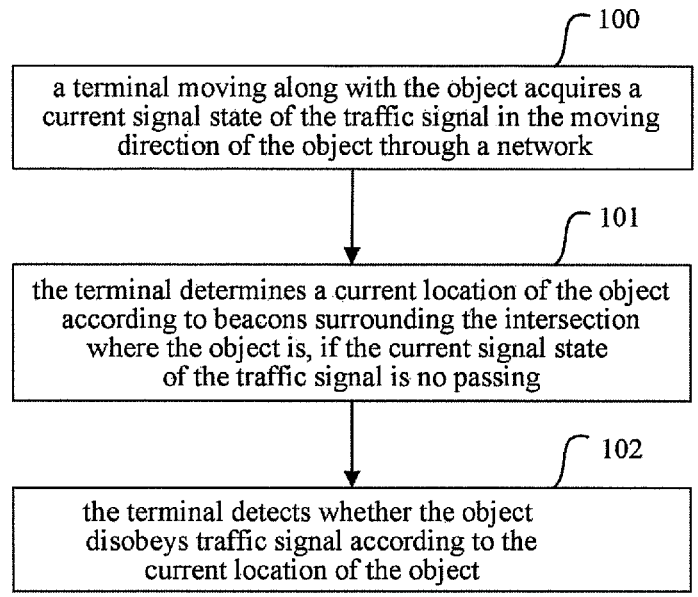
FIG. 1 is a schematic flowchart illustrating a method for detecting whether an object violates a traffic signal according to an embodiment of the present disclosure.

As shown in FIG. 1, the method for detecting whether an object violates a traffic signal provided by the embodiment of the present disclosure includes the following steps.

In step 100: a terminal moving along with the object acquires a current signal state of the traffic signal in the moving direction of the object through a network;

In step 101: the terminal determines a current position of the object according to beacons surrounding the intersection where the object is, if the current signal state of the traffic signal is no passing;

In step 102: the terminal detects whether the object violates or disobeys a traffic signal according to the current position of the object.

In the embodiment of the present disclosure, the terminal moving along with the object is in communication with the network to acquire the state of the traffic signal in the moving direction of the object; when the acquired state of the traffic signal is in the No-Passing state, the terminal determines a current position of the object according to beacons surrounding the intersection where the object is; and then, the terminal moving along with the object detects whether the object violates the traffic signal according to the determined current position of the object. Since the terminal moving along with the object according to the embodiment of the present disclosure can determine the state of the traffic signal through the network, determine the specific position of the object according to the beacons surrounding the intersection, and detect whether the object violates the traffic signal according to the state of the traffic signal and the specific position of the object, the occurrence of traffic accidents is reduced.

In this case, the terminal moving along with the object may be a device having network communication function, such as a mobile phone, a computer, a Pad (tablet computer) or the like.

The object may include a user or a transportation. According to an embodiment, the transportation may include, but are not limited to, some or all of the following: a shared bicycle and a shared car.

The shared bicycle refers to a bicycle (including an electric bike) that is provided by an enterprise to provide time-share leases service on campuses, subway stations, bus stops, residential areas, commercial areas, public service areas, etc.

The terminal moving along with the object is bound to or paired with the object, and the manner for specific binding or pairing depends on the type of the object. The object and the paired device can communicate using a wireless connection, which may include any connection under Bluetooth® or other standards.

For example, if the object is a user, the terminal can be bound to the user's identity information (such as an ID card); or if the object is a shared bicycle, the terminal can be bound to the vehicle identifier of the shared bicycle.

Figure 2:
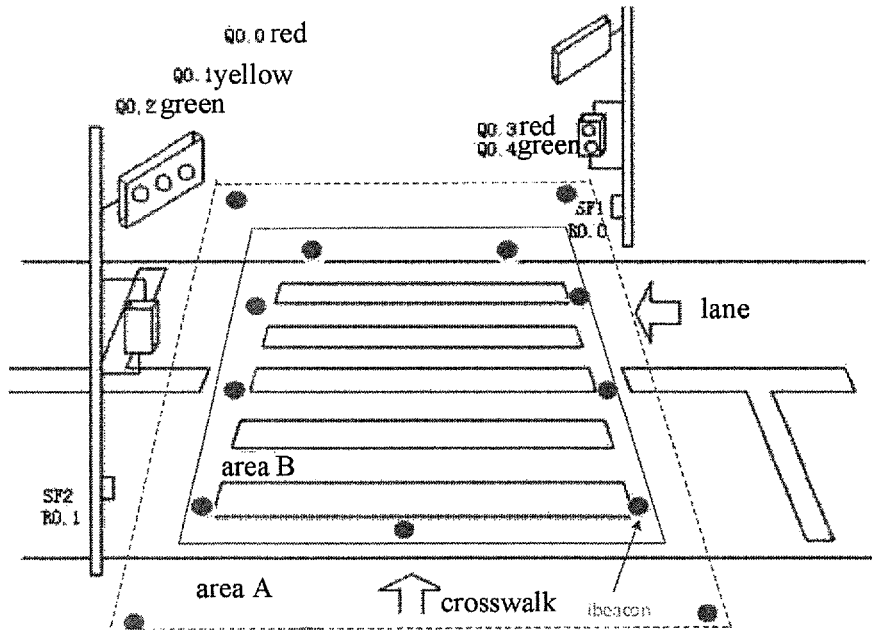
FIG. 2 is a schematic diagram illustrating a circumstance for detecting whether an object violates a traffic signal according to an embodiment of the present disclosure.

The traffic signal in the moving direction is a traffic signal that is closest to the object on a road when the object moves along the road. As shown in FIG. 2, the direction that the sidewalk arrow in FIG. 2 points up to is south direction. At this time, the object moves along the direction that the sidewalk arrow points up to (i.e., the object moves from north to south), and the traffic signal in its moving direction is the traffic signal SF1 facing it.

The terminal according to the embodiment of the present disclosure can acquire the position of the object, the landmark building in its moving direction, the intersection, and the like through the satellite, such as, Global Positioning System (GPS), Beidou, GLONASS, or the like.

In an implementation, the terminal may periodically obtain the current signal state of the traffic signal in the moving direction of the object through the network.

The signal states of traffic signal may include: traffic state (e.g., green light) and no passing state (e.g., yellow light or red light).

According to an embodiment, if the traffic signal is in no passing state currently, the terminal determines beacons surrounding the intersection where the object is located in a wireless manner; the terminal determines a distance from each beacon according the received signal strength of each determined beacon; and the terminal determines the current position of the object according to the distance from each beacon.

Specifically, when the traffic signal acquired by the mobile terminal is in no passing state (i.e., yellow light or red light), the terminal may acquire wirelessly the beacons of the intersection at which is determined by GPS.

The wireless manner may include, but not be limited to, some or all of the following: scanning functionality of Bluetooth®, searching functionality of Wi-Fi (wireless broadband) network, a mobile communication, a digital transmission radio and the like.

In an implementation, when the terminal determines the beacon of the intersection where the object is, the terminal receives a Received Signal Strength Indication (RRSI) value sent by each beacon, and the terminal may calculate the distance from each beacon to the terminal according to the received signal strength and the environment at the site.

The specific calculation method is as described in formula 1.

$$d = 10^{((abs(RSSI)-N)/(10*n))} \quad \text{Formula 1:}$$

Where, N is the signal strength at a distance of 1 meter between the transmitter and the receiver and n is the environmental attenuation factor.

Specifically, after the distance between each surrounding beacon and the terminal is determined, the specific location of the object is determined according to the determined distance from each surrounding beacon to the terminal.

Figure 3:
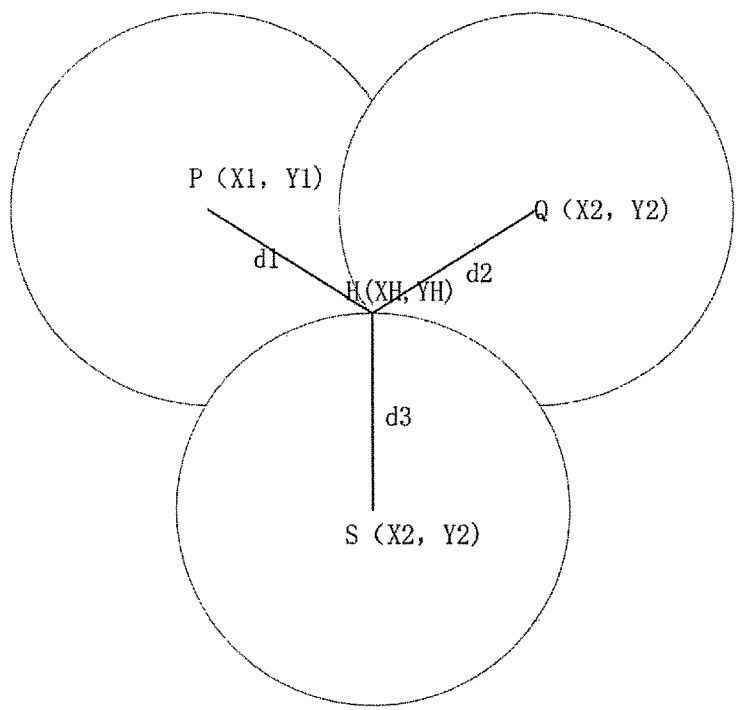
FIG. 3 is a schematic diagram illustrating a manner for determining the specific location of the object according to an embodiment of the present disclosure.

The specific implementation can be obtained through the centroid localization basic algorithm. As shown in FIG. 3, the center point H is the specific position where the object is, and the surrounding points P, Q, and S are the positions where surrounding beacons are, d1 is the distance from the surrounding beacon P to the position H, d2 is the distance from the surrounding beacon Q to the position H and d3 is the distance from the surrounding beacon S to the position H. The value of d1, d2 and d3 can be determined by Formula 1. The terminal can determine the position of the beacon according to the information sent by the beacon. If the position of the beacon P is (X1, Y1), the position of the beacon Q is (X2, Y2), and the position of the beacon S is (X3, Y3), the specific position where the object is can be determined according to the position information of the beacons and the distance from the beacons to the object. The specific determination method is as shown in Formula 2:

$$XH=[X1/(d1+d2)+X2/(d2+d3)+X3/(d3+d1)]/[1/(d1+d2)+1/(d2+d3)+1/(d3+d1)]$$

$$YH=[Y1/(d1+d2)+Y2/(d2+d3)+Y3/(d3+d1)]/[1/(d1+d2)+1/(d2+d3)+1/(d3+d1)]$$

The determined specific position of the object is (XH, YH).

It should be noted that the foregoing implementation for determining the specific location of the moving object is an example of the embodiment of the present disclosure, and any method that can determine the specific location of the moving object can be applied to the present disclosure.

In this embodiment, the distances from the object to the surrounding beacons are determined by the signal strength of the surrounding beacons, and the specific position of the object is further calculated according to the determined distances, thereby ensuring the accuracy for the determined position of the object.

According to an embodiment, after the terminal determines whether the object violates a traffic signal according to the current position of the object, the terminal sends a warning message when the terminal determines that the distance between the object and the intersection is lower than a threshold corresponding to the type of the object and the object does not violate the traffic signal.

For example, if the current distance between the object and the intersection is 10 meters, the threshold between the object and the intersection that is set in the terminal is 20 meters, the current state of the traffic signal is in red or yellow light state, and the object does not violate the traffic signal, then the terminal may send a warning message.

The threshold corresponding to the type of the object is the distance from the object to the intersection and set in the terminal, and the threshold may be adjusted and set according to the type of the object.

For example, in the case of threshold for different types of objects at the same speed, the distance threshold from the object to the intersection is 20 meters for a bicycle, and the distance threshold is 40 meters for an automobile.

In an implementation, the threshold may also be adjusted according to the speed of the object.

For example, the object is a shared bicycle, if the current speed of the shared bicycle is 12 km/hour, the set threshold is 10 meters; if the current speed of the shared bicycle is 20 kilometers/hour, the set threshold is 20 meters.

The sent warning message may include, but not be limited to, the following some or all of: a ticking alarm sound and a voice message such as a voice prompt for attention of red light and the like.

In the implementation, according to a limitation of the distance from the object to the intersection, when the object moves into the area defined by the limitation of the distance and the object does not violate the traffic signal, the terminal may send a warning message at this time to prompt the state of the traffic signal at the intersection ahead the user of the object so as to prepare the user, and may warn the user not to go red light, thereby reducing the number of violating the traffic signal.

In an implementation, the distance from the object to the intersection may also be set as an area.

Specifically, as shown in FIG. 2, the object moves in the direction of its motion. The dotted area (area A) shown in FIG. 2 is a set warning area. When the object moves into the dotted area but has not arrived at the intersection yet, that is, the object is in the area A shown in FIG. 2, if the current traffic signal is in red or yellow light state, a warning message is received.

In this case, the setting of the area A (warning area) may vary depending on the type of the object.

For example, the warning area for a car will be greater than the warning area for a bicycle.

According to an embodiment, if the object is a shared bicycle, after the terminal determines that the distance between the object and the intersection is lower than a threshold corresponding to the type of the object and the object does not violate the traffic signal, the terminal controls a braking module of the shared bicycle in a wireless manner to slow the shared bicycle down according to the current acceleration of the shared bicycle.

As shown in FIG. 2, when the shared bicycle enters the area A as shown in the figure, the terminal determines the current speed of the shared bicycle, and then slows it down wirelessly, so that it can stop before entering the area B.

In this case, the current acceleration of the shared bicycle is also the current acceleration of the terminal.

Specifically, the terminal measures the current speed of the shared bicycle using the accelerometer of the terminal and communicates with the braking module of the shared bicycle in a wireless manner, and then the wireless communication module sends the Pulse Width Modulation (PWM) to the motor drive circuit, thereby controlling motor to run at a certain angle. This causes that the motor pulls the brake cable of the shared bicycle through the mechanical structure so as to control the shared bicycle to slow down. When the speed is lower than a certain threshold, the braking force of the shared bicycle braking system is maximized and the bicycle cannot travel freely.

Figure 4:
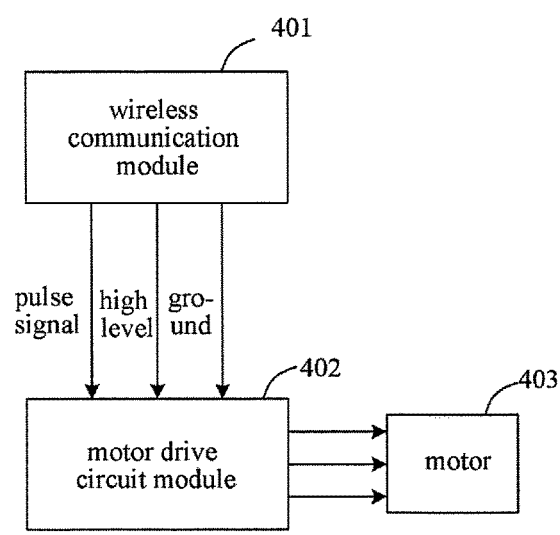
FIG. 4 is a schematic diagram illustrating a manner for restraining the object to violate the traffic signal according to an embodiment of the present disclosure.

As shown in FIG. 4, the wireless communication module 401 is connected with the motor drive circuit module 402. When the motor drive circuit module 402 receives the pulse sent by the wireless communication module 401, it will adjust the rotation speed according to the received pulse. The adjusted rotation speed is transmitted to the motor 403, and the motor 403 changes its operating angle to pull the brake cable, thereby tightening the caliper brake or brake wood and achieving the purpose of slowing the shared bicycle down.

Figure 5:
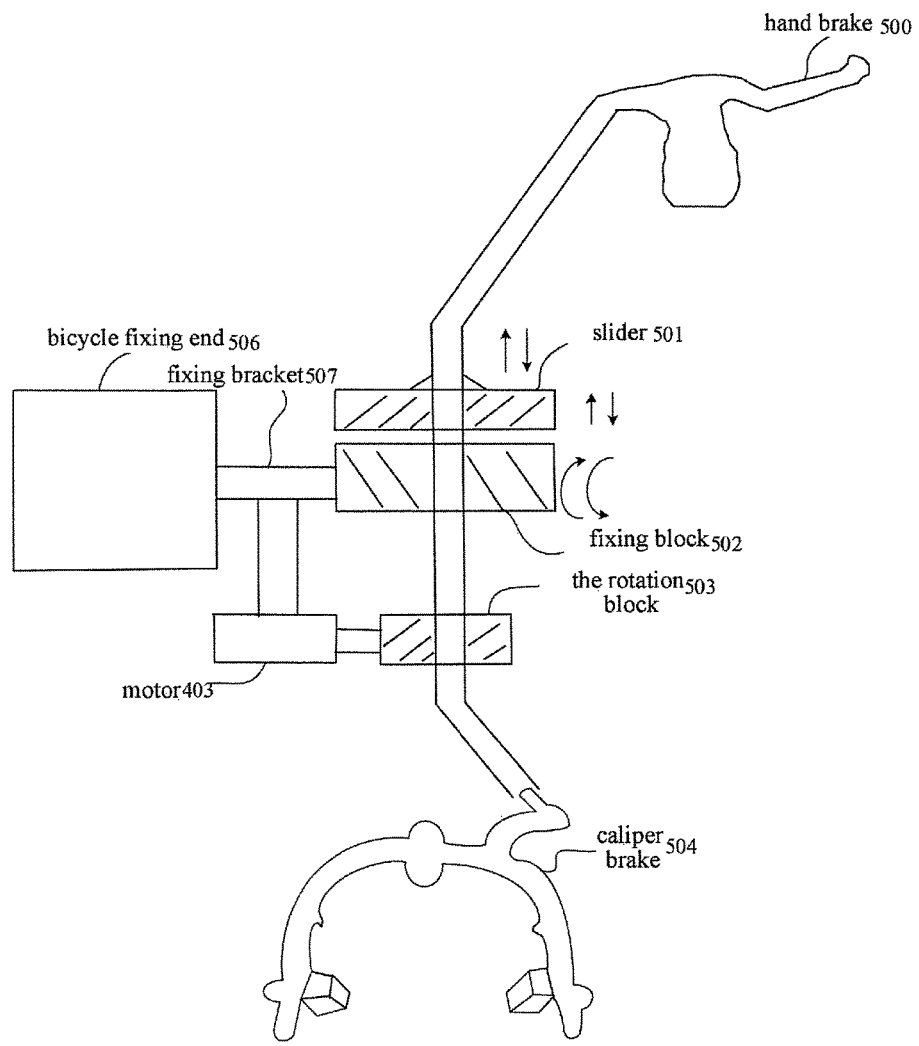
FIG. 5 is a schematic diagram illustrating a manner for restraining the object to violate the traffic signal according to another embodiment of the present disclosure.

A specific implementation is shown in FIG. 5. The brake cable of the hand brake 500 is connected to the caliper brake 504 through a slider 501 including a through hole, a fixing block 502 including a through hole and a rotation block 503 including a through hole. When the shared bicycle is manually slowed down, the distance between the slider 501 including the through hole and the hand brake is changed by tightening the hand brake 500 to tighten the brake cable and control the caliper brake 504. In this case, the fixing block 502 including the through hole is connected with the fixing bracket 507 and the bicycle's fixing end 506 to fix the brake cable.

In the embodiment of the present disclosure, a rotation block 503 including a through hole is also connected with the motor. The motor circuit drive module in the motor 403 is connected with the wireless communication module, receives the pulse information sent by the wireless communication module in a wireless manner, and changes the rotation angle and the rotation speed of the rotation block 503 including the through hole according to the sent pulse information, so as to tighten the brake cable to control the caliper brake 504. Thus the shared bicycle is slowed down and impossible to be ridden, and this stops the shared bicycle to violate the traffic signal.

In this case, after the pulse sent by the wireless communication module 401 is received by the motor circuit drive module 402 in the motor 403, when the motor circuit drive module 402 realizes the deceleration of the bicycle by controlling the rotation block 503 including the through hole, the brake cable may be pulled; however, it should be ensured that the brake cable between the hand brake 500 and the slider 501 including the through hole cannot be pulled. At this time, the slider 501 including the through hole can slide and ensure that the brake cable between the hand brake 500 and the slider 501 including the through hole cannot be pulled, thereby ensuring that the brake cable cannot be entangled.

In practice, if it is detected that the current state of the traffic light is a no-passing state, the distance between the object and the intersection is less than the threshold, and the object does not violate the traffic signal, then the braking module may brake the object so as to stop the object from operating before it violates the traffic signal. This further reduces the number of violation of the traffic signal and avoids traffic accidents.

According to an embodiment, after the terminal detects whether the object violates a traffic signal according to the current position of the object, if the object violates the traffic signal, the terminal reports information with regard to violation of the traffic signal to a network side.

Specifically, after the terminal detects that there is an object that violates the traffic signal, the terminal reports information with regard to violation of the traffic signal to a network side. In this case, the information with regard to violation of the traffic signal may include, but is not limited to, some or all of the following: the time spent for violating the traffic signal, the specific position where the traffic signal is, the information of the object that violates the traffic signal, the information about the user who uses the object that violates the traffic signal and so on.

In practice, as shown in FIG. 2, when it is detected that the object violates a traffic light, the object is on the crosswalk, that is, the area B as shown in FIG. 2. At this time, the terminal may record the information with regard to violation of the traffic signal and report it to a network side.

In this case, the area B is determined according to beacons, such as the ibeacon® surrounding the crosswalk, and the beacons are pre-provided, as shown in FIG. 2.

In practice, the terminal reports information with regard to violation of the traffic signal to a network side and makes relevant records for the users who violates the traffic signal and the object. This ensures that the substantive information may be provided for the following corresponding punishment measures in practice.

Specifically, in the implementation, after the terminal reports information with regard to violation of the traffic signal to a network side, the network side also regularly sends illegal information about violation of the traffic signal to traffic management departments and/or companies associated with the object; the traffic management department will provide appropriate education or punishment for the user who uses the object when the object violates the traffic signal; and the company associated with the object may perform corresponding punishment measures for the user according to the information provided by the network side.

In this case, the punishment measures may include, but are not limited to, some or all of the following: increasement of the billing for the user who violates the traffic signal, cancellation of qualification for use of the object for a period of time, and so on.

In the course of implementation, through the implementation of corresponding punishment measures, it is possible to reduce the occurrence of violations of traffic regulations such as violation of the traffic signal, thereby avoiding occurrence of traffic accidents and maintaining the personal safety of object users and the property safety of object owners.

Based on the same inventive concept, an embodiment of the present disclosure further provides a device for detecting whether an object violates a traffic signal. Since the device corresponds to a method for detecting whether an object violates a traffic signal according to an embodiment of the present disclosure and its principle for solving the problem is similar to the method, the implementation of the device can be found in the implementation of the method, and the repeated description will be omitted.

Figure 6:
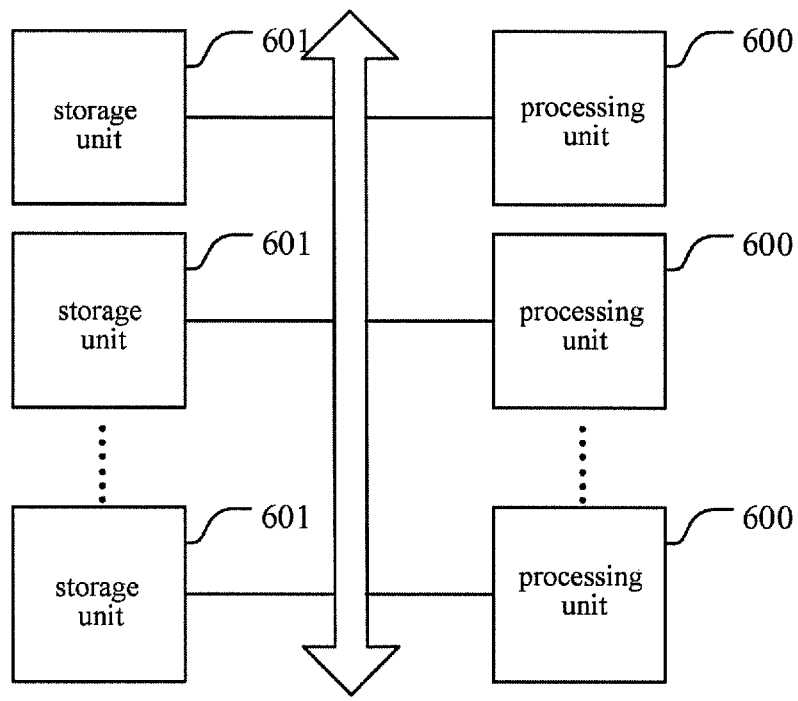
FIG. 6 is a schematic diagram illustrating a structure of a device for detecting whether an object violates a traffic signal according to an embodiment of the present disclosure.

As shown in FIG. 6, a first device for detecting whether an object violates a traffic signal according to an embodiment of the present disclosure may include at least one processing unit 600 and at least one storage unit 601. The at least one storage unit 601 stores program codes, which cause the at least one processing unit 600 to perform the following steps when executed:

acquiring a current signal state of the traffic signal in the moving direction of the object through a network;

determining a current position of the object according to beacons surrounding the intersection where the object is, if the current signal state of the traffic signal is no passing; and detecting whether the object violates a traffic signal according to the current position of the object.

The device may be the above terminal. The processing unit 600 may be a processor. The storage unit 601 may be a memory.

Specifically, the object is a user or a transportation.

According to an embodiment, the transportation is a shared bicycle.

According to an embodiment, the at least one processing unit 600 is configured to:

determine beacons surrounding the intersection wirelessly, if the current signal state of the traffic signal is no passing;

determine a distance from each beacon according to the received signal strength of each determined beacon; and determine the current position of the object according to the distance from each beacon.

According to an embodiment, the at least one processing unit 600 is further configured to send a warning message after the distance between the object and the intersection is lower than a threshold corresponding to the type of the object and the object does not violate the traffic signal.

According to an embodiment, the at least one processing unit 600 is further configured to, if the object is a shared bicycle, control a braking module of the shared bicycle in a wireless manner to slow the shared bicycle down according to the current acceleration of the shared bicycle.

According to an embodiment, the at least one processing unit 600 is further configured to, if the object violates the traffic signal, report information with regard to violation of the traffic signal to a network side.

Figure 7:
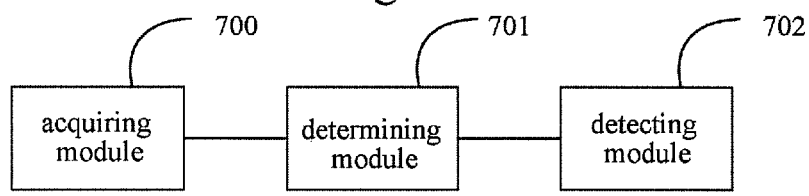
FIG. 7 is a schematic diagram illustrating a structure of a device for detecting whether an object violates a traffic signal according to another embodiment of the present disclosure.

As shown in FIG. 7, a second device for detecting whether an object violates a traffic signal according to an embodiment of the present disclosure may include: an acquiring module 700, a determining module 701 and a detecting module 702.

The acquiring module 700 is configured to acquire a current signal state of the traffic signal in the moving direction of the object through a network.

The determining module 701 is configured to determine a current position of the object according to beacons surrounding the intersection where the object is, if the current signal state of the traffic signal is no passing.

The detecting module 702 is configured to detect whether the object violates a traffic signal according to the current position of the object.

According to an embodiment, the determining module 701 is further configured to:

determine beacons surrounding the intersection wirelessly, if the current signal state of the traffic signal is no passing;

determine a distance from each beacon according the received signal strength of each determined beacon; and determine the current position of the object according to the distance from each beacon.

According to an embodiment, the detecting module 702 is further configured to send a warning message after the distance between the object and the intersection is lower than a threshold corresponding to the type of the object and the object does not violate the traffic signal.

Specifically, the object is a user or a transportation.

According to an embodiment, the transportation is a shared bicycle.

According to an embodiment, the detecting module 702 is further configured to, if the object is a shared bicycle, control a braking module of the shared bicycle in a wireless manner to slow the shared bicycle down according to the current acceleration of the shared bicycle.

According to an embodiment, the detecting module 702 is further configured to, if the object violates the traffic signal, report information with regard to violation of the traffic signal to a network side.

The present application is described above with reference to block diagrams and/or flowcharts illustrating the method, the device (system) and/or the computer program product according to embodiments of the present disclosure. It will be understood that a block of the block diagrams and/or flowchart illustrations and combinations of blocks in the block diagrams and/or flowchart illustrations can be implemented by computer program instructions. These computer program instructions may be provided to a general purpose computer, a processor of a special purpose computer, and/or other programmable data processing device to generate a machine so that instructions executed via the computer processor and/or other programmable data processing device can create the method for implementing the functions/actions specified in the block diagram and/or flowchart block.

Accordingly, the present application may also be implemented in hardware and/or software (including firmware, resident software, microcode, and the like). Further, the present application may take the form of a computer program product on a computer-usable or computer-readable storage medium having computer-usable or computer-readable program codes embodied in the medium for using by an instruction execution system or using in conjunction with the instruction execution system. In the context of the present application, a computer-usable or computer-readable medium may be any medium that can contain, store, communicate, transmit, or transfer a program for using by an instruction execution system, device, or device, or using in conjunction with an instruction execution system, device, or apparatus.

It will be apparent to those skilled in the art that various modifications and variations can be made in the present disclosure without departing from the spirit and scope of the present disclosure. Thus, if these modifications and variations of the present disclosure fall within the scope of the claims of the present disclosure and their equivalents, the present disclosure is also intended to include these modifications and variations.

What is claimed is:

1. A method for detecting whether an object violates a traffic signal, comprising:
   acquiring, by a terminal moving along with the object, a current signal state of the traffic signal in a moving direction of the object through a network, the terminal being paired with the object;
   determining, by the terminal, a current position of the object according to beacons surrounding an intersection where the object is in response to the current signal state of the traffic signal being no passing; and
   detecting, by the terminal, whether the object violates a traffic signal according to the current position of the object;
   wherein the step of the terminal determining a current position of the object according to beacons surrounding the intersection where the object is, comprises:
   determining, by the terminal, beacons surrounding the intersection wirelessly, in response to the current signal state of the traffic signal being no passing;
   determining, by the terminal, a distance from each beacon according the received signal strength of each determined beacon; and
   determining, by the terminal, the current position of the object according to the distance from each beacon.

2. The method according to claim 1, wherein the object is a user or a transportation.

3. The method according to claim 2, wherein the transportation is a shared bicycle.

4. The method according to claim 1, wherein, after the terminal determines whether the object goes through traffic signal according to the current location of the object, the method further comprises:
   sending, by the terminal, a warning message after the terminal determines that the distance between the object and the intersection is lower than a threshold corresponding to the type of the object and the object does not violate the traffic signal.

5. The method according to claim 4, wherein, after the terminal determines that the distance between the object and the intersection is lower than a threshold corresponding to the type of the object and the object does not violate the traffic signal, the method further comprises:
   the object being a shared bicycle, controlling, by the terminal, a braking module of the shared bicycle in a wireless manner to slow the shared bicycle down according to a current acceleration of the shared bicycle.

6. The method according to claim 1, wherein, after the terminal detects whether the object violates a traffic signal according to the current position of the object, the method further comprises:

in response to the object violating the traffic signal, the terminal reports information with regard to violation of the traffic signal to a network side.

7. A device for detecting whether an object violates a traffic signal, the device being paired with the object and comprising:
  at least one processing unit and at least one storage unit, wherein
  the at least one storage unit stores program codes, which cause the at least one processing unit to perform the following steps when executed:
  acquiring a current signal state of the traffic signal in a moving direction of the object through a network;
  determining a current position of the object according to beacons surrounding an intersection where the object is, if the current signal state of the traffic signal is no passing; and
  detecting whether the object violates a traffic signal according to the current position of the object;
  wherein the at least one processing unit is configured to:
  determine beacons surrounding the intersection wirelessly, if the current signal state of the traffic signal is no passing;
  determine a distance from each beacon according the received signal strength of each determined beacon; and
  determine the current position of the object according to the distance from each beacon.

8. The device according to claim 7, wherein the object is a user or a transportation.

9. The device according to claim 8, wherein the transportation is a shared bicycle.

10. The device according to claim 7, wherein the at least one processing unit is further configured to send a warning message after the distance between the object and the intersection is lower than a threshold corresponding to the type of the object and the object does not violate the traffic signal.

11. The device according to claim 10, wherein the at least one processing unit is further configured to, if the object is a shared bicycle, control a braking module of the shared bicycle in a wireless manner to slow the shared bicycle down according to a current acceleration of the shared bicycle.

12. The device according to claim 7, wherein the at least one processing unit is further configured to, if the object violates the traffic signal, report information with regard to violation of the traffic signal to a network side.

13. A non-transitory computer readable storage medium, storing one or more programs for execution by one or more processors, the one or more programs including instructions for:
  acquiring a current signal state of the traffic signal in a moving direction of an object through a network;
  determining a current position of the object according to beacons surrounding an intersection where the object is, if the current signal state of the traffic signal is no passing; and
  detecting whether the object violates a traffic signal according to the current position of the object;
  wherein the one or more programs further include instructions for:
  determining beacons surrounding the intersection wirelessly, if the current signal state of the traffic signal is no passing;
  determining a distance from each beacon according the received signal strength of each determined beacon; and
  determining the current position of the object according to the distance from each beacon.

14. The medium according to claim 13, wherein the one or more programs further include instructions for:
  sending a warning message after the distance between the object and the intersection is lower than a threshold corresponding to the type of the object and the object does not violate the traffic signal.

15. The medium according to claim 14, wherein the one or more programs further include instructions for:
  if the object is a shared bicycle, controlling a braking module of the shared bicycle in a wireless manner to slow the shared bicycle down according to a current acceleration of the shared bicycle.

16. The medium according to claim 13, wherein the one or more programs further include instructions for:
  if the object violates the traffic signal, reporting information with regard to violation of the traffic signal to a network side.

* * * * *